（12) United States Patent
Knapp et al.

(10) Patent No.: US 9,677,764 B2
(45) Date of Patent: Jun. 13, 2017

(54) METHOD FOR ADJUSTING A NATURAL GAS TEMPERATURE FOR A FUEL SUPPLY LINE OF A GAS TURBINE ENGINE

(71) Applicant: ALSTOM Technology Ltd, Baden (CH)

(72) Inventors: Klaus Knapp, Gebenstorf (CH); Peter Marx, Birmenstorf (CH); Karl Reyser, Küssaberg (DE); Maria-Belen Gasser-Pagani, Baden (CH)

(73) Assignee: ANSALDO ENERGIA IP UK LIMITED, London (GB)

( * ) Notice: Subject to any disclaimer, the term of this patent is extended or adjusted under 35 U.S.C. 154(b) by 483 days.

(21) Appl. No.: 14/189,206

(22) Filed: Feb. 25, 2014

(65) Prior Publication Data

US 2014/0238035 A1  Aug. 28, 2014

(30) Foreign Application Priority Data

Feb. 25, 2013 (EP) .................................... 13156508

(51) Int. Cl.
*F02C 9/40* (2006.01)
*F23N 1/00* (2006.01)
(Continued)

(52) U.S. Cl.
CPC ............ *F23N 1/002* (2013.01); *F02C 7/224* (2013.01); *F02C 9/00* (2013.01); *F02C 9/40* (2013.01); *F05D 2260/80* (2013.01); *Y02E 20/16* (2013.01)

(58) Field of Classification Search
CPC .... F02C 3/16; F02C 3/30; F02C 6/003; F02C 7/224; F02C 9/40; F23R 3/36
See application file for complete search history.

(56) References Cited

U.S. PATENT DOCUMENTS 6,082,092 A   7/2000  Vandervort
6,896,707 B2  5/2005  O'Rear et al.
(Continued)

FOREIGN PATENT DOCUMENTS

CN   101793196 A   8/2010
CN   102562320 A   7/2012
(Continued)

OTHER PUBLICATIONS

Office Action issued on Jul. 23, 2015, by the State Intellectual Property Office, P.R. China in corresponding Chinese Patent Application No. 201410064194.1, and an English Translation of the Office Action. (18 pages).

*Primary Examiner* — Jason L Vaughan
*Assistant Examiner* — Amanda Meneghini
(74) *Attorney, Agent, or Firm* — Buchanan Ingersoll & Rooney PC

(57) ABSTRACT

The method for adjusting a natural gas temperature for a fuel supply line of a gas turbine engine includes measuring by infrared analysis the natural gas percentage content of methane ($CH_4$), ethane ($C_2H_6$), propane ($C_3H_8$), butane ($C_4H_{10}$), carbon dioxide ($CO_2$), calculating the nitrogen ($N_2$) percentage content as the complement to 100 of the measured percentage content of methane ($CH_4$), ethane ($C_2H_6$), propane ($C_3H_8$), butane ($C_4H_{10}$), carbon dioxide ($CO_2$), calculating an index indicative of the natural gas energy content and adjusting the natural gas temperature on the basis of the index.

5 Claims, 1 Drawing Sheet

(51) Int. Cl.
*F02C 7/224* (2006.01)
*F02C 9/00* (2006.01)

(56) References Cited

U.S. PATENT DOCUMENTS

| | | | |
|---|---|---|---|
| 7,435,080 B2 * | 10/2008 | Joklik | F02D 35/0092 |
| | | | 431/121 |
| 7,472,540 B2 | 1/2009 | Berenbrink et al. | |
| 7,690,204 B2 | 4/2010 | Drnevich et al. | |
| 7,730,726 B2 | 6/2010 | Asti et al. | |
| 7,905,082 B2 | 3/2011 | Estrada et al. | |
| 7,966,802 B2 | 6/2011 | Szepek et al. | |
| 7,980,082 B2 | 7/2011 | Ziminsky et al. | |
| 8,020,387 B2 | 9/2011 | Prade | |
| 8,534,075 B2 | 9/2013 | Ziminsky et al. | |
| 2005/0028530 A1 * | 2/2005 | Doebbeling | F02C 3/22 |
| | | | 60/773 |
| 2006/0174630 A1 | 8/2006 | Hellat et al. | |
| 2006/0185367 A1 | 8/2006 | Hino et al. | |
| 2008/0115482 A1 | 5/2008 | LaGrow et al. | |
| 2010/0050641 A1 | 3/2010 | Nag | |
| 2010/0162678 A1 * | 7/2010 | Annigeri | F02C 3/20 |
| | | | 60/39.281 |
| 2010/0307157 A1 * | 12/2010 | Bilton | F02C 6/18 |
| | | | 60/730 |
| 2010/0319359 A1 * | 12/2010 | Holt | F02C 6/08 |
| | | | 60/782 |
| 2011/0041504 A1 | 2/2011 | Estrada et al. | |
| 2011/0185702 A1 | 8/2011 | Bilton et al. | |
| 2011/0203291 A1 | 8/2011 | Erickson et al. | |
| 2011/0270502 A1 | 11/2011 | Demougeot et al. | |
| 2011/0289932 A1 | 12/2011 | Thompson | |
| 2011/0296844 A1 | 12/2011 | Widener et al. | |
| 2012/0055157 A1 | 3/2012 | Gulen et al. | |
| 2012/0079831 A1 * | 4/2012 | Kirzhner | F02C 7/22 |
| | | | 60/776 |
| 2012/0090327 A1 * | 4/2012 | Rofka | F01K 17/04 |
| | | | 60/772 |
| 2012/0102914 A1 | 5/2012 | Kirzhner et al. | |

FOREIGN PATENT DOCUMENTS

| | | |
|---|---|---|
| DE | 103 02 487 | 7/2003 |
| EP | 1214981 A1 | 6/2002 |
| EP | 1 953 352 | 8/2008 |
| EP | 2 204 561 | 7/2010 |
| EP | 2 204 563 | 7/2010 |
| EP | 2 261 485 | 12/2010 |
| EP | 2 339 148 | 6/2011 |
| EP | 2 557 297 | 2/2013 |
| RU | 81561 U1 | 3/2009 |
| RU | 2426945 C2 | 8/2011 |
| WO | 2004/076925 | 9/2004 |
| WO | 2005/071316 | 8/2005 |
| WO | 2011/154528 | 12/2011 |

* cited by examiner

METHOD FOR ADJUSTING A NATURAL GAS TEMPERATURE FOR A FUEL SUPPLY LINE OF A GAS TURBINE ENGINE

CROSS-REFERENCE TO RELATED APPLICATIONS

This application claims priority to European application 13156508.7 filed Feb. 25, 2013, the contents of which are hereby incorporated in its entirety.

TECHNICAL FIELD

The present disclosure relates to a method for adjusting a natural gas temperature for a fuel supply line of a gas turbine engine and to a gas turbine engine.

BACKGROUND

Combined cycle power plants have a gas turbine engine and a steam turbine engine. The gas turbine engine can be supplied with natural gas that is pre-heated (i.e. its temperature is adjusted before it is injected into the combustion chamber of the gas turbine engine) to optimize efficiency; usually pre-heating is achieved by heating the natural gas to a maximum allowable temperature using steam or feedwater from the steam cycle.

Flexibility with regards to the natural gas composition is an important feature for those combined cycle power plants that are supplied from different natural gas pipelines, from a LNG harbour or from a pipeline where additionally a natural gas treatment plant is installed.

In general when the natural gas source is changed, the natural gas composition is also changed. Change in natural gas composition can cause a change in the behavior of the combustion process. For example, a natural gas with high inert contents and hence a lower heating value requires an increased supply pressure; this may lead to changes in gas reactivity and mixing quality.

For this reason the composition of the natural gas supplied to a combined cycle power plant (in particular to a gas turbine of such a plant) is measured.

In order to measure the composition of the natural gas, different devices are known, namely:

Infrared analyzers, these devices allow measurement of the hydro carbons; in addition they have the advantage that their response is quite fast; this is useful because the natural gas supply (and thus the natural gas composition) can be changed on a weekly, daily or hourly basis or even much faster if for example in a LNP plant the higher hydro carbon trips according to the fuel supply conditions). Infrared analyzers have the disadvantage that they are not able to measure the natural gas content of nitrogen (N2, the N2 amount can be quite large in natural gas), because this compound does not respond to infrared radiation.

Chromatography analyzers, these devices can measure the hydro carbon content and also the nitrogen (N2) content of the natural gas. The disadvantage of chromatography analyzers is that their response is very slow, because it can take minutes for them to analyze the natural gas composition. Such a slow response can lead to instability of the combustion in the gas turbine engine.

The changes in natural gas composition could happen slowly if the switch of gas line is planned (usually around 5-30 minutes) or they could happen quickly if an unplanned event triggers a change of natural gas (usually around 30 seconds).

SUMMARY

An aspect of the disclosure includes providing a method for adjusting the temperature of the natural gas (pre-heating temperature) to optimize reliability and efficiency.

Advantageously, for continuous reliable operation of a combined cycle power plant with fluctuating gas compositions at optimum combined cycle efficiency the actual gas composition is measured and a maximum allowable fuel gas temperature is defined and controlled for the fuel supply line or different fuel supply lines.

Advantageously, the method allows a fast response of the gas turbine engine operation to changes in composition of the natural.

These and further aspects are attained by providing a method and gas turbine in accordance with the accompanying claims.

BRIEF DESCRIPTION OF THE DRAWINGS

Further characteristics and advantages will be more apparent from the description of a preferred but non-exclusive embodiment of the method and gas turbine engine, illustrated by way of non-limiting example in the accompanying drawings, in which.

DETAILED DESCRIPTION

Figure 1:
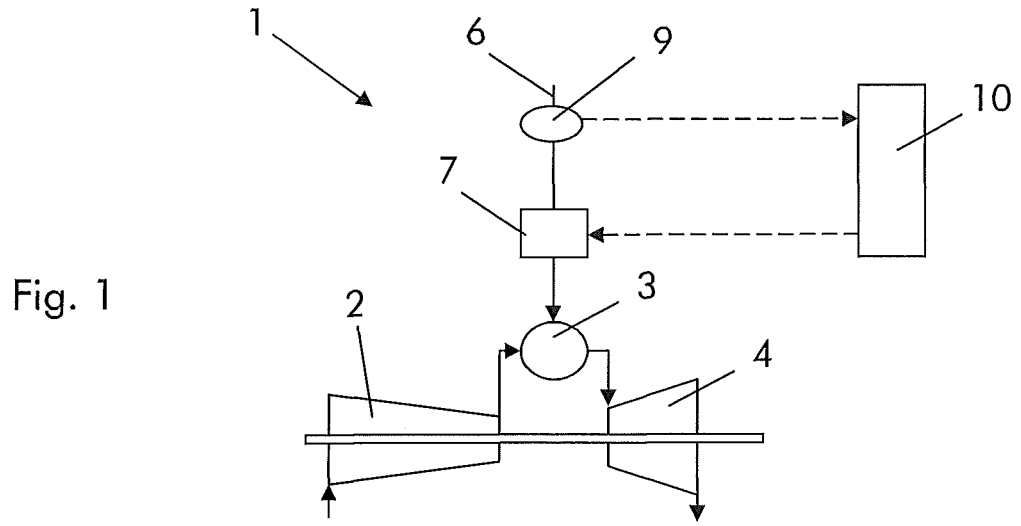
FIGS. 1 and 2 are schematic views of different gas turbine engines.

The method for adjusting the natural gas temperature for a fuel supply line of a gas turbine engine comprises the following steps:

measuring by infrared analysis the natural gas percentage content (preferably molar or volumetric percentage but also mass percentage) of methane ($CH_4$), ethane ($C_2H_6$), propane ($C_3H_8$), butane ($C_4H_{10}$), carbon dioxide ($CO_2$), calculating the nitrogen ($N_2$) percentage content as the complement to 100 of the measured percentage content of methane ($CH_4$), ethane ($C_2H_6$), propane ($C_3H_8$), butane ($C_4H_{10}$), carbon dioxide ($CO_2$); in other words:

$$[N2\%]=100\%-[CH4\%]-[C2H6\%]-[C3H8\%]-[C4H10\%]-[CO25]$$

The largest part of the natural gas content is defined by methane, ethane, propane, butane, carbon dioxide and nitrogen, thus even if additional components such as argon are contained in the natural gas, they do not negatively affect the measure of nitrogen as for the precision required. In addition, since the hydro carbon content is measured by infrared analysis and the nitrogen content is calculated, the composition of the natural gas can be monitored with a fast response.

Further steps of the method include:

calculating an index indicative of the natural gas energy content, and adjusting the natural gas temperature on the basis of the index.

For example, adjusting the natural gas temperature includes defining a plurality of ranges for the index, associating one maximum temperature to each range, and maintaining the natural gas temperature below or at the maximum temperature corresponding to the range into which the calculated index falls. This can be advantageously done by means of look up tables. The look up tables can be prepared during the validation tests of the gas turbine engine.

In order to take into account the natural gas composition, the index can be calculated by:
- calculating the lower heat value of a mixture including the measured amount of methane (CH4), ethane (C2H6), propane (C3H8), butane (C4H10), carbon dioxide (CO2) and the calculated amount of nitrogen (N2)
- calculating the molecular weight of the mixture including the measured amount of methane (CH4), ethane (C2H6), propane (C3H8), butane (C4H10), carbon dioxide (CO2) and the calculated amount of nitrogen (N2). This can be done by summing the molecular weight of each component in view of its percentage in the mixture.

The index NGI (Natural Gas Interchange) is calculated by:

$$NGI=(LHVng/LHVch4)*(Mng/Mch4)^{1/2}$$

wherein
LHVng is the calculated lower heat value of the mixture
LHVch4 is the lower heat value of methane
Mng is the molecular weight of the mixture
Mch4 is the molecular weight of methane.
In this case the reference for the index is a fuel being methane.
Alternatively, the index can be calculated with reference to the design conditions for the gas turbine engine.
In this case the index IGN is calculated as follows:

$$NGI=(LHVng/LHVdes)*(Mng/Mdes)^{1/2}$$

wherein
LHVng is the calculated lower heat value of the mixture
LHVdes is the design lower heat value
Mng is the molecular weight of the mixture
Mdes is the design molecular weight.

If the gas turbine engine has a plurality of fuel supply lines for different combustion chambers and/or different stages of a combustion chamber the natural gas temperature of at least one fuel supply line can be adjusted independently of the natural gas temperature of another fuel supply line.

The method above described can be implemented in a gas turbine engine 1 comprising a compressor 2, a combustion chamber 3 and a turbine 4.

The combustion chamber 3 has a fuel supply line 6 with a heat exchanger 7 for adjusting a natural gas temperature (i.e. to pre-heat the natural gas that is supplied through the line 6 to the combustion chamber 3 of the gas turbine 1).

The heat exchangers can be of different types and can be supplied with different warm fluids such as for example steam, warm air from the cooling air cooler or warm water.

In addition, the gas turbine engine 1 has a sensor 9 for measuring by infrared analysis the natural gas percentage content of methane (CH4), ethane (C2H6), propane (C3H8), butane (C4H10), carbon dioxide (CO2); since infrared analysis is used this measure is very fast (seconds).

The sensor 9 is connected to a controller 10 for calculating the percentage content of nitrogen (N2) as the complement to 100 of the measured percentage content of methane (CH4), ethane (C2H6), propane (C3H8), butane (C4H10), carbon dioxide (CO2).

In addition, the controller 10 also calculates an index indicative of the natural gas energy content and on the basis of this index the controller 10 drives actuators for the heat exchanger to adjust the natural gas temperature.

The actuators are usually defined by valves that regulate the steam flow or warm air flow or warm water flow. Other kinds of actuators are possible.

When the method is implemented in a gas turbine engine like the one described, look up tables can be used.

Thus, if the calculated NGI is for example 0.75, the maximum temperature for the natural gas to be injected into the combustion chamber 3 of the gas turbine engine of FIG. 1 is a given temperature according to the look up table. The natural gas will be pre-heated at this given temperature or at a temperature lower than this given temperature.

The method can also be used in gas turbine engine with sequential combustion.

Figure 2:
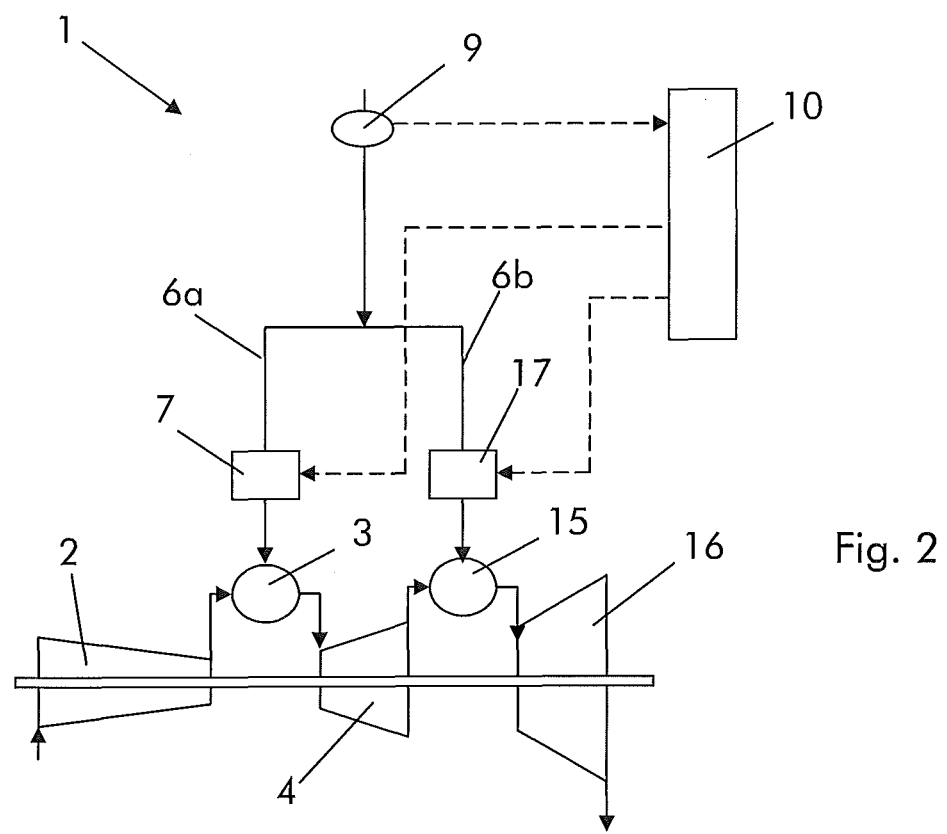

FIG. 2 shows a gas turbine engine with sequential combustion; in FIG. 2 like reference numbers as in FIG. 1 indicates the same or similar components, i.e. the gas turbine engine 1 has the compressor 2, the combustion chamber 3, the turbine 4, the heat exchanger 7, the sensor 9 and the controller 10.

In addition, the gas turbine engine 1 includes a sequential combustion chamber 15 that is supplied with the flue gases from the turbine 4 and a second turbine 16 to expand hot gases generated in the sequential combustion chamber 15.

In this example, the fuel supply line of the combustion chamber 3 is indicated by the reference 6a and the fuel supply line of the sequential combustion chamber is indicated by the reference 6b.

The fuel supply line 6b has a heat exchanger 17 for adjusting the natural gas temperature.

The controller 10 drives the actuators of the heat exchanger of the fuel supply line 6a of the combustion chamber 3 independently of the actuators of the heat exchanger 17 of the fuel supply line 6b of the sequential combustion chamber 15.

When the method is implemented in a gas turbine engine like the one described, look up tables can be used.

Thus, if the calculated NGI is for example 0.75, the maximum temperature for the natural gas to be injected into the combustion chamber 3 is a given temperature and the maximum temperature for the natural gas to be injected into the combustion chamber 15 is this given temperature.

The operation of the gas turbine engine is apparent from that described and illustrated and is substantially the following (with reference to FIG. 2).

Air is compressed in the compressor 2 and supplied into the combustion chamber 3 in which also natural gas is supplied. The natural gas is combusted generating hot gas that is expanded in the turbine 4. The exhaust gas from the turbine 4 is supplied into the sequential combustion chamber 15 where additional natural gas is provided and combusted generating hot gas. This hot gas is expanded in the second turbine 16 and is then discharged.

A common line supplies fuel to the fuel supply lines 6a and 6b. The sensor 9 measures the content (percentage) of methane, ethane, propane, butane, carbon dioxide; this measure is very fast (seconds). The information on the percentage content of methane, ethane, propane, butane, carbon dioxide is provided to the controller 10 that calculates the content (percentage) of nitrogen and the molecular weight of a mixture having the measured percentage of methane, ethane, propane, butane, carbon dioxide and the calculated percentage of nitrogen. The total amount will not be exactly 100%, but this does not affect the adjustment.

Then the index NGI is calculated and for example on the basis of look up tables the maximum temperature for the natural gas supplied to the combustion chamber 3 and sequential combustion chamber 15 is found (these temperature are in general different but could also be the same).

The temperature of the natural gas must not be higher than the maximum temperature found, i.e. the temperature of the natural gas can be lower than the maximum temperature, but for efficiency reasons, preferably the temperature of the natural gas (pre-heating) is adjusted to the maximum temperature or to a value close to it.

Naturally the features described may be independently provided from one another.

In practice the materials used and the dimensions can be chosen at will according to requirements and to the state of the art.

The invention claimed is:

1. A gas turbine engine comprising:
   a compressor, a combustion chamber and a turbine,
   the combustion chamber having a fuel supply line with a heat exchanger for adjusting a natural gas temperature, the gas turbine engine including:
   at least a sensor for measuring by infrared analysis a natural gas percentage content of methane ($CH_4$), ethane ($C_2H_6$), propane ($C_3H_8$), butane ($C_4H_{10}$), carbon dioxide ($CO_2$), and
   a controller configured for calculating a percentage content of nitrogen ($N_2$) as a complement to 100 of the measured percentage content of methane ($CH_4$), ethane ($C_2H_6$), propane ($C_3H_8$), butane ($C_4H_{10}$), carbon dioxide ($CO_2$),
   the controller being configured for further calculating an index indicative of a natural gas energy content based on the measured and calculated percentage content of the natural gas and for driving actuators for the heat exchanger to adjust the natural gas temperature on the basis of the index.

2. The gas turbine engine of claim 1, comprising:
   a sequential combustion chamber that is supplied with flue gases from the turbine, and a second turbine configured to expand hot gases generated in the sequential combustion chamber, wherein the sequential combustion chamber has a fuel supply line with a heat exchanger for adjusting the natural gas temperature, and the controller is configured for driving the actuators of the heat exchanger of the fuel supply line of the combustion chamber independently of the actuators of the heat exchanger of the fuel supply line of the sequential combustion chamber.

3. The gas turbine engine of claim 1, wherein the gas turbine engine comprises:
   a plurality of fuel supply lines for different combustion chambers and/or different stages of a combustion chamber, and the natural gas temperature of at least one fuel supply line is adjusted independently of the natural gas temperature of another fuel supply line.

4. The gas turbine engine of claim 1, wherein the controller is configured for defining a plurality of ranges for the index, associating one maximum temperature to each range, and maintaining the natural gas temperature below or at the maximum temperature corresponding to the range into which the calculated index falls.

5. The gas turbine engine claim 1, wherein the controller is configured for calculating the lower heat value of a mixture including the measured amount of methane ($CH_4$), ethane ($C_2H_6$), propane ($C_3H_8$), butane ($C_4H_{10}$), carbon dioxide ($CO_2$) and the calculated amount of nitrogen ($N_2$), calculating the molecular weight of the mixture including the measured amount of methane ($CH_4$), ethane ($C_2H_6$), propane ($C_3H_8$), butane ($C_4H_{10}$), carbon dioxide ($CO_2$) and the calculated amount of nitrogen ($N_2$), and calculating the index either by $NGI=(LHVng/LHVch4)*(Mng/Mch4)^{1/2}$ or $NGI=(LHVng/LHVdes)*(Mng/Mdes)^{1/2}$ wherein LHVng is the calculated lower heat value of the mixture, LHVch4 is the lower heat value of methane, LHVdes is the design lower heat value, Mng is the molecular weight of the mixture, Mch4 is the molecular weight of methane, Mdes is the design molecular weight.

* * * * *